March 20, 1962 H. L. DANIELS 3,026,029
DATA PROCESSING CODE CARD
Filed April 30, 1958
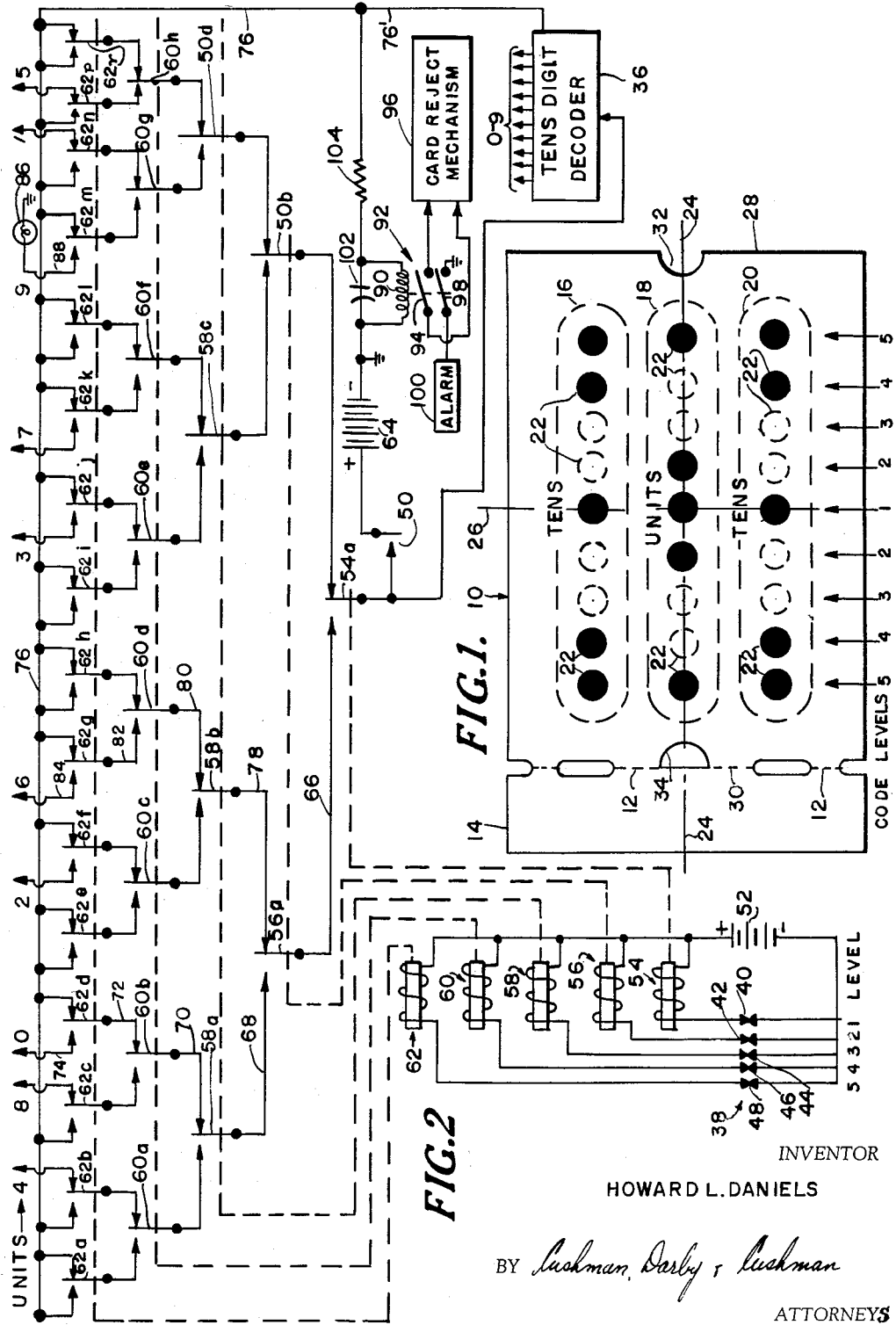
INVENTOR
HOWARD L. DANIELS
BY Cushman, Darby & Cushman
ATTORNEYS

United States Patent Office 3,026,029
Patented Mar. 20, 1962

3,026,029
DATA PROCESSING CODE CARD
Howard L. Daniels, West St. Paul, Minn., assignor to Sperry Rand Corporation, New York, N.Y., a corporation of Delaware
Filed Apr. 30, 1958, Ser. No. 731,968
12 Claims. (Cl. 235—61.12)

This invention relates generally to data processing and more specifically to information decoding circuitry and a symmetrical code card as the input means therefor.

In many applications, it is necessary to provide a means whereby information can be processed as rapidly as possible. For example, in many toll checking systems, prepunched tickets or cards having information encoded therein by the perforations are used in conjunction with an input device for digital data processing equipment to provide the necessary statistical data needed for current and future planning as well as to provide an accurate accounting of all tolls collected. These toll tickets are issued to vehicle operators upon entry to the toll facilities and contain data in codal form as to the classification of the vehicle, the nature of the transaction or other pertinent data. The vehicle operator in turn surrenders this ticket upon leaving the toll facilities and pays his fee based on the vehicle classification and the mileage between the entry and exit points.

This ticket may then be inserted in an input device which can be used to prepare a punched paper tape suitable for use in digital data processing equipment.

During rush periods of traffic it becomes necessary to process these tickets or coded cards as rapidly as possible in order to prevent unnecessary traffic congestion at the toll exit installation.

It is accordingly an object of this invention to provide an improved and novel code card suitable for use as an input to data processing equipment.

Another object of the present invention is to provide a code card with codal areas thereon arranged symmetrically about the card so that it can be handled more rapidly than heretofore possible.

Because of this symmetrical design, tabulating cards can be manually inserted by a toll patron in a reading assembly more rapidly than heretofore possible. The customer does not have to concern himself with proper positioning of said ticket before inserting it in the information sensing apparatus.

Still another object of the present invention is to provide improved means for reading the codal data contained on a code card which means includes for each order of data decoding circuits and a set of data sensing elements plus means for detecting an illegal code on a card.

Other objects and advantages of this invention will become obvious to those having ordinary skill in the art by reference to the following detailed description of an exemplary embodiment of the invention and the appended claims in conjunction with the accompanying drawings, wherein:

FIGURE 1 illustrates an exemplary coded card, and
FIGURE 2 illustrates an exemplary card reading apparatus.

For purposes of an illustrative embodiment of this invention, the following discussion will be mainly directed to use thereof in toll road or like type installations. Such use, however, should not be considered limitative since numerous other environments may be employed for the invention.

The ticket or code card 10 shown in FIGURE 1 represents the preferred form of one aspect of this invention. The material used in the manufacture of the ticket may be standard tabulating card stock. A plurality of such tickets may be bound in book form and sold as such to regular or prospective customers or commuters using or desiring to use the associated toll road or facility. A perforated line 12 may be provided to facilitate the removal of ticket 10 from stub 14.

The codal indicia in each of the dash line rows 16, 18 and 20, are shown as discrete circular areas 22. Preferably, each of these indicia or areas is either a perforation or blank (no perforation). The areas which are perforated in accordance with a predetermined code are illustrated as black dots, while the areas which are blanks are represented by a dotted circle.

The code areas 22 in totality are arranged in a symmetrical manner in all four quadrants about the central longitudinal axis 24 and the central transverse axis 26 of the code card 10. Symmetry of the card is one of the chief advantages thereof over previously used tickets. Because of such symmetry, ticket 10 can be inserted into the slot (not shown) of a ticket reader in numerous ways and yet be read or decoded, as long as the slot is of sufficient dimension to accommodate the narrow dimension of the ticket. That is, either end 28 or end 30 of the card 10, can be inserted into the slot of a ticket reading assembly, and the same information will be sensed thereby. Also, when the coding on the ticket is by apertures and blanks, it does not matter which side of the ticket is up when inserted. It is assumed and preferred that the slot is not wide enough to accommodate the longer dimension of the card. The ticket is further preferably provided with two cut-outs 32 and 34, one at each end of the ticket to aid in registration of the coded indicia 22 with information sensing elements yet to be described. Cut-outs 32 and 34, if used, may be of any desired shape, such as V-shaped or semi-circular as shown.

The codal indicia in or on ticket 10 may be in the form of an excess-three, five level, binary code, and such is employed to illustrate the invention. However, limitation thereto is not intended since other coding schemes such as the 2-out-of-5 decimal representation or straight binary code, for example, may be used if desired.

The information represented by the codal indicia on the tabulating card may in a toll system designate the class of vehicle operated by the customer. The vehicle classification is typically dependent on the number of axles on the vehicle. For example, passenger automobiles having two axles may be in class 1, tractor and trailer trucks may be in class 2, 3 or 4 depending on whether they have 3, 4 or 5 axles, etc. The nature of the transaction (cash, non-revenue, etc.) may also be represented in coded form.

Symmetry about the central transverse axis 26 for each of the rows of codal indicia is preferably provided by the use of an odd number of code areas 22 in each half of each row with the central code area in each row being shared by each half of the row. Limitation to an odd number of code areas in each half of each row is not intended, but is preferred for odd parity checking purposes. For any of the above mentioned types of codes, only four binary code levels are needed to represent the decimal digits 0 through 9. The fifth level in a five-level card may be employed to make the number of apertures or the like (as contrasted to blank areas or the like), in the half of each row odd in number. As shown in FIGURE 1, the fifth code level is represented by the codal indicia at both of the outer ends of each row, with the codal indicia progressively toward the center of each row representing respectively and progressively the lesser code levels, code level 1, for each half of each row, being represented by a single area disposed centrally on the transverse axis 26. It is to be understood that code level 5 may be represented by the central code area with progression downward toward each of the outer ends of each row, or that any other desired sequential arrangement of code level representation may be employed as long as the sensing equipment employed with the card is similarly arranged.

The ticket in the form shown in FIGURE 1 has two digit positions, i.e., the "tens" and the "units" digit for respectively representing two different orders of information. It is, therefore, possible by such a card to represent all the numbers from 0 to 99 in binary code. The "units" row 18 is symmetrical about the longitudinal axis 24, i.e., it is parallel thereto and in the illustration coincides therewith. The "tens" digit row is repeated twice as shown by rows 16 and 20, each being spaced equidistantly from the "units" row 18 and consequently parallel to the longitudinal axis 24. This provides the desired symmetry of the different digit rows relative to the longitudinal axis.

Circuitry employed to read or decode information contained on a card such as that shown in FIGURE 1 is illustrated in FIGURE 2. Similar sensing and decoding apparatus may be used for each of the "units" and "tens" orders of coded information, and consequently, only one such decoder is illustrated in detail in FIGURE 2, the other being shown therein as block 36. Upon insertion of card 10 of FIGURE 1 into the conventional slot (not shown) of a decoding assembly, one half of the coded areas 22 of the "units" row 18, and one half of the coded areas of only one of the "tens" rows 16, 18, becomes positioned in the respective groups of sensing elements. Assuming that decoder 36 is employed to decode the "tens" digit, the group of sensing elements 38 in FIGURE 2 is disposed to read one half of the codal indicia in the "units" row 18 of FIGURE 1. Each coded area in one half of the row 18 is sensed by a respective sensing element in group 38. Assuming card 10 of FIGURE 1 is inserted in the decoding apparatus with end 30 thereof being forward and approaches the sensing elements 38 of FIGURE 2 from the right side thereof, sensing elements 40, 42, 44, 46 and 48, respectively sense the 1–5 code levels of the left end of the "units" row 18. It is to be understood that decoder 36 has a similar set of sensing elements which is employed to sense the respective 5 code level representations in a predetermined one of the left ends of the "tens" rows 16, 20.

Upon correct registration of the proper code areas of the card with the respective sensing elements, switch 50 is closed as by the card itself moving thereagainst, or by an intermediate aid such as a mechanical linkage (not shown) which senses the completion of card motion or of hole-reading contacts when same are employed with a card apertured in accordance with a code.

For purposes of explanation, it will be assumed that an apertured card is employed with the circuitry of FIGURE 2, and consequently, that the group of sensing elements 38, and the like group thereof in decoder 36, include a plurality of pins or similar hole-reading contacts well known in the art. Further, it will be assumed that the hole pattern in ticket 10 of FIGURE 1 is the one presently employed on a card inserted in the decoding apparatus. Consequently, upon complete insertion of a card, the "units" sensing elements or contacts 40, 42 and 48 are closed, while contacts 44 and 46 are open. Current from a source such as battery 52 may then flow through the coils of relays 54, 56 and 62, but not through the coils of relays 58 and 60, thereby causing the contact arms of the respective energized relays to move from their normally closed rightmost position shown in FIGURE 2 to the left so as to make contact with the leftmost relay contacts. The switches or contacts of the relays are interconnected in a "tree" configuration with the lowest echelon relay 54 having a single switch with contact arm 54a and the highest echelon relay 62 having the largest number of switches with contact arms respectively numbered 62a—62r. The intermediate relays 56—58 and 60 have progressively, in that order, twice the number of switches or contact arms as the preceding lower echelon relay. Therefore, when relays 54, 56 and 62 are energized, and switch 50 is closed, current from an energy source (such as battery 64) flows through contact arm 54a, line 66, contact arm 56a, line 68, contact arm 58a, line 70, contact arm 60b, line 72, contact arm 62d, to line 74 which is further designated as the "0" units decimal digit output line. Besides this output line, there are nine other output lines respectively designated as the 1–9 units decimal digit output lines, and respectively connected to the illustrated contacts associated with relay 62. The remaining contacts for this relay are coupled to a single line 76 which may be referred to as a "bus bar." Thus bus bar will be later referred to in reference to illegal code combinations.

For purposes of further explaining the circuitry of FIGURE 2, it may be assumed that the sensing element group 38 is associated with one half of one of the "tens" rows of the code of FIGURE 1. In this instance, only the coils of relays 54, 60 and 62 would be energized by the closing of sensing elements 46 and 48, respectively. Only the contact arms of switches associated with relays 54, 60 and 62 move to their left-hand position. Current from battery 64 may then flow through switch 50 when closed to line 66, to line 78, to line 80, through contact arm 60d to line 82, and through contact arm 62g to line 84, a signal upon which presents the decimal digit 6.

External indicators in the form of overhead lights, such as light 86 connected to the "9" decimal digit output line 88, may be utilized to display the corresponding decimal digits for a visual check of the vehicle classification by a toll attendant in order that fraud may be greatly reduced.

Fraud is further extensively reduced by the incorporation of an illegal code combination indicating system. That is, if a card is inserted into the decoding apparatus of FIGURE 2, and the card has apertures in either half of either row being sensed in such a manner as to cause current from battery 64 to be impressed on the bus bar 76, or a similar bus bar 76' from decoder 36, rather than any of the decimal digit output lines, current will flow back to the battery through coil 90 of relay 92. This operates relay 92 to cause closure of its contact 94 whereby a card reject mechanism 96 may be actuated to reject the card, for example as by destroying and/or ejecting it. Such a mechanism may be of the type referred to in the U.S. Dreher Patent No. 2,755,860, as therein described particularly relative to FIGURES 7 and 11. Relay 92 may, in addition, or alternatively, include switch contact 98 which is employed to operate an alarm 100 comprising for example a buzzer or light visible to an attendant.

When the card reject mechanism 96 is located a considerable distance from the card sensing elements in the decoders, it is advantageous to employ a delay circuit with the coil of relay 92 so that the relay contact 94 remains closed until the card has entered the reject mechanism and has been disposed of. A convenient type of delay circuit may include condenser 102 shunted across relay coil 90 and resistor 104 in series therewith.

It is to be understood that the reading or decoding apparatus of this invention may employ switching trees or the like which do not include relays and their tree formed switching contacts. For example, transistors may be so connected in a tree configuration to replace the relay switching arrangement shown.

When a parity check scheme is employed with the cards used with the decoding system, the system automatically rejects cards whose card combinations are illegal. That is, with the employment of an odd parity check scheme wherein the fifth level, for example, is represented by a codal indicium so as to make the number of perforations in each digit odd, the decoding circuitry of FIGURE 2 will sense not only an odd number of apertures, but also an even number thereof and, in the latter case, cause the illegal code combination relay 92 to be energized. This checking feature provides error free operation of the toll system as well as inhibiting surreptitious practices such as counterfeiting tickets.

It therefore becomes apparent that this invention provides a system whereby toll transactions can be processed in an extremely short time. Besides the use of this invention in toll-checking systems, the invention may be used in conjunction with production machinery in a factory for recording certain data as to the operator, time of operation, product output, and other items of interest in combination with the working of the factory machine enabling the accounting department to figure the cost of operation on the materials being processed as well as to determine the efficiency of the overall operation.

Thus, it is apparent that there is provided by this invention apparatus in which the various objects and advantages herein set forth are successfully achieved.

Modifications of this invention not described herein, will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A code card comprising a card having first and second central axes orthogonal to each other and a plurality of discrete codal areas, said areas being arranged in rows parallel to and symmetrical about said first axis, each of said areas in each half of each row representing a different level of a given code with opposite said halves of any said row having identical code level representation, the resulting code level columns being parallel to, and symmetrical as to level representation, about said second axis.

2. A code card as in claim 1 wherein some of said areas respectively include an aperture in accordance with said given code.

3. A code card as in claim 1 wherein the number of rows of said areas is at least equal to three, one row being on said first axis and the other two rows being on opposite sides thereof at equal distances.

4. A code card as in claim 3 wherein each half of the central row of areas represents one coded order of information and each half of each of the other rows represents another coded order of information, each half of each row being a mirror image of the other half thereof with respect to the area coding.

5. A code card as in claim 1 wherein the number of areas of at least one of the rows as odd and the central area thereof is shared by each half of the row.

6. A code card as in claim 1 wherein the code level representation by each of the areas for at least one row thereof is by numerical sequence from the outer ends of said one row toward the center thereof.

7. A code card as in claim 1 wherein the area at each end of at least one row represents the highest of the code levels and the remaining areas of each half of said one row represent progressively toward the center respectively the downward progression of the code levels to the lowest thereof.

8. A code card comprising a rectangular card having longitudinal and transverse central axes and a plurality of discrete codal areas, said areas being arranged in at least three parallel rows with the outer rows being equidistant from the central row and the latter being on said longitudinal axis, one half of each of the rows being effectively on opposite sides of said transverse axis, the areas of each half of said central row being encoded to represent one order of given information in accordance with a code having a plurality of code levels, the areas in each half of the other two rows being encoded to represent another order of said information in accordance with said code, each half of any row being a mirror image of the other half of the same row with respect to the encoding thereof, the sequence of code level representation being the same for each of said rows.

9. For use with apparatus capable of receiving an inserted card having coded information thereon, sensing the information and reporting same in decoded form, the improvement comprising a card having first and second central axes orthogonal to each other and a plurality of coded indicia, said indicia being arranged in a plurality of rows with one row being on said first axis and the other rows being parallel thereto, one half of the number of said other rows being on each side of said one row, each of said rows being symmetrical about said second axis, the codal indicia in each half of said one row representing one order of said information in accordance with a code having a plurality of code levels, two rows on opposite sides of said one row and equidistant therefrom forming a pair, the codal indicia in each half of each row of said pair representing another order of said information in accordance with said code, the sequence of code levels from the outer end inward for each half of at least said pair of rows being the same, the arrangement being such that said card may be inserted into said apparatus with either end of said first axis forward whereby one half of the indicia in said one row and one half of the indicia in one of the rows of said pair may be sensed and decoded.

10. Apparatus as in claim 9 wherein the codal indicia respectively include given discrete areas in each of said rows some of said areas respectively including an aperture in accordance with said code whereby said card may be inserted into said apparatus either side up and still provide the information which is to be decoded.

11. Apparatus as in claim 9 wherein the number of rows of indicia is at least three and the number of indicia in each row is odd with the central indicium of each row being shared by each half of the respective row.

12. Apparatus as in claim 11 wherein the indicia code level representation is highest at the outer ends of each row and progressively lower to the lowest level at the center thereof.

References Cited in the file of this patent

UNITED STATES PATENTS

| | | |
|---|---|---|
| 2,288,770 | Armbruster | July 7, 1942 |
| 2,310,445 | Lang | Feb. 9, 1943 |
| 2,320,836 | Tauschek | June 1, 1943 |
| 2,514,031 | Daly | July 4, 1950 |